H. A. HEAVEY.
HAULING MOTOR.
APPLICATION FILED NOV. 26, 1906.
934,912.
Patented Sept. 21, 1909.
3 SHEETS—SHEET 1.
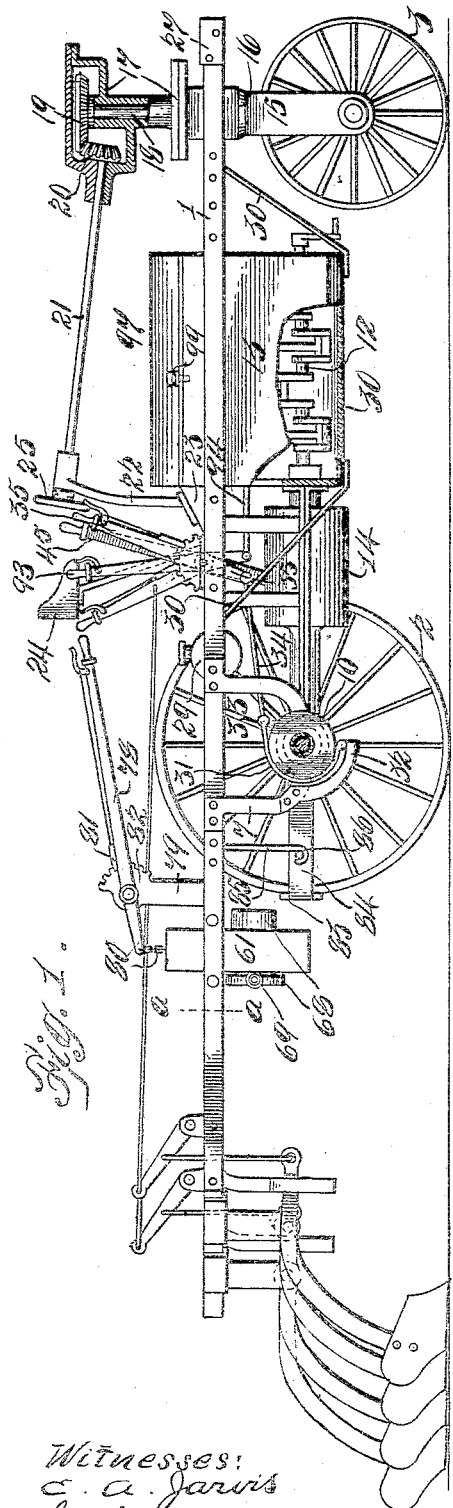
Witnesses:
E. A. Jarvis
C. E. Dow
Inventor:
H. A. Heavey
By Plant Deemer
Attorney.

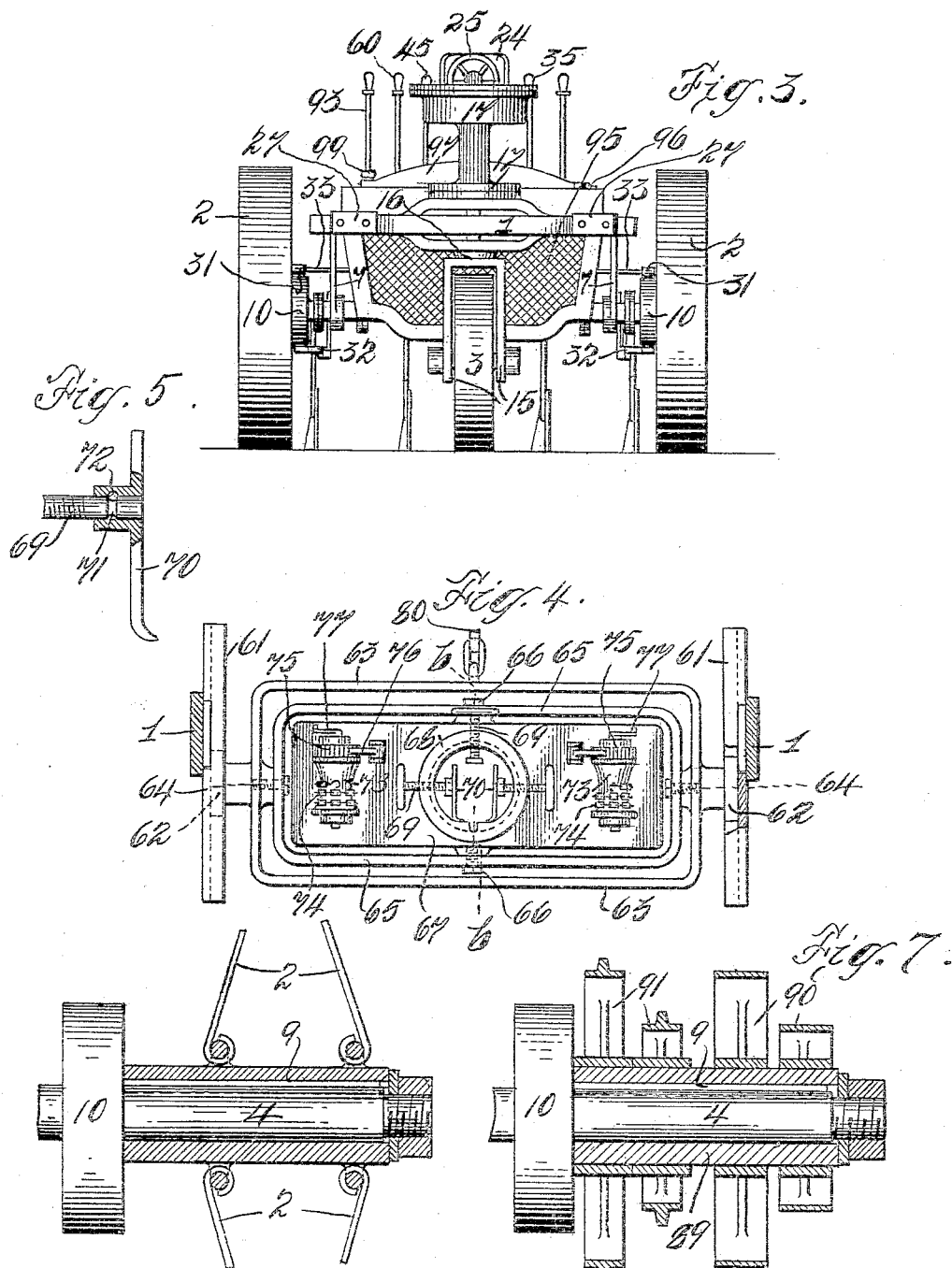

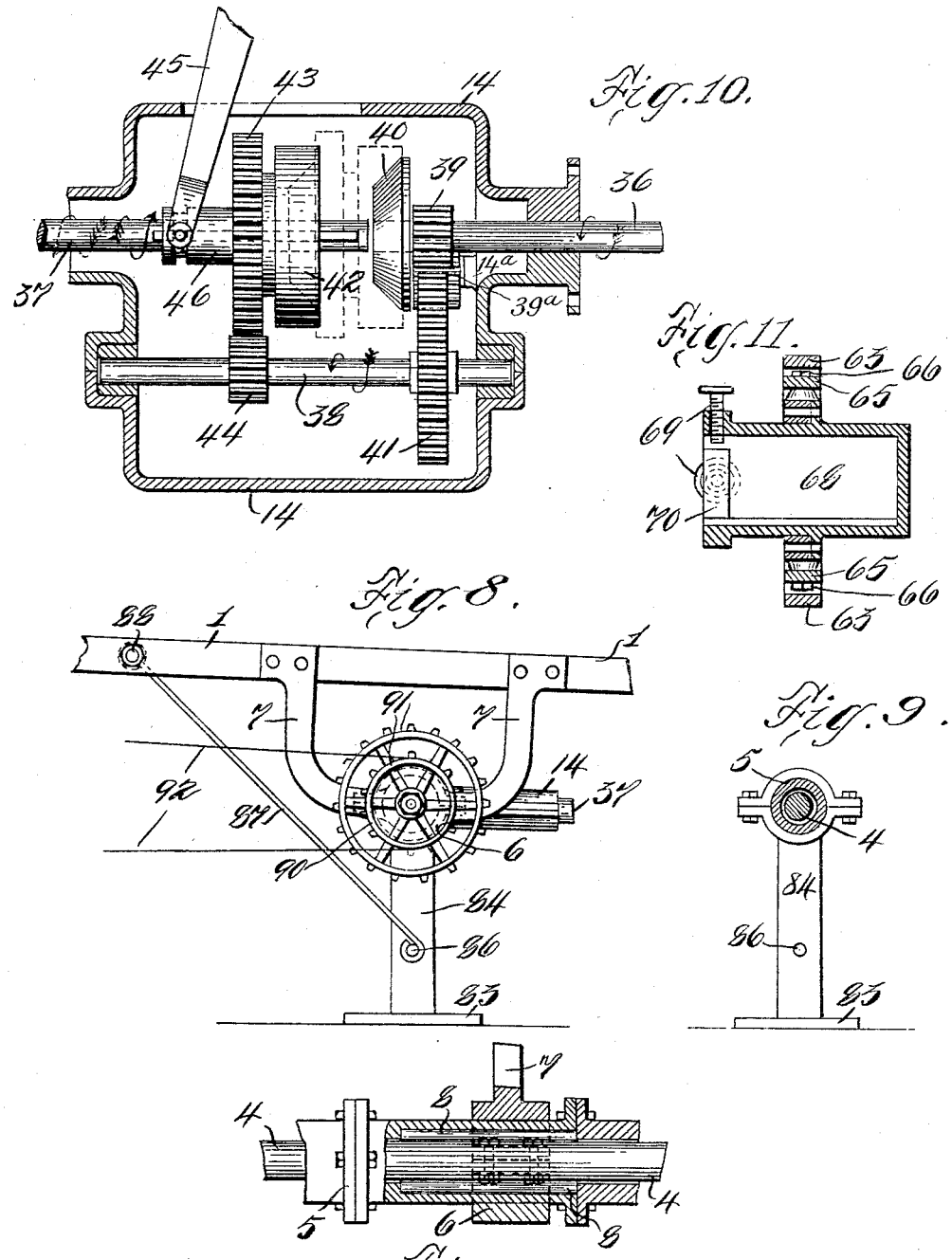

UNITED STATES PATENT OFFICE.

HAROLD ARTHUR HEAVEY, OF PASKENTA, CALIFORNIA.

HAULING-MOTOR.

934,912.

Specification of Letters Patent.   Patented Sept. 21, 1909.

Application filed November 26, 1906.   Serial No. 345,053.

*To all whom it may concern:*

Be it known that I, HAROLD A. HEAVEY, a citizen of the United States, and resident of Paskenta, county of Tehama, and State of California, have invented certain new and useful Improvements in Hauling-Motors, of which the following is a specification, reference being had to the accompanying drawing, forming a part thereof, in which similar numerals of reference indicate corresponding parts.

This invention has for its object to provide an efficient traction engine especially adapted and arranged to be used for hauling farm implements and vehicles, for drawing plows, and which may also be readily arranged to be used as a stationary engine.

The invention will first be described and then will be specifically defined in claims hereinafter set forth.

Reference is made to the accompanying drawings forming part of this specification and in which—

Figure 1, is a side elevation of the apparatus with its motor casing partly broken away. Fig. 2, is a plan view thereof; Fig. 3, is a front end view thereof; Fig. 4, is an enlarged rear view of the hauling device with the frame in cross section on the line *a—a*, in Fig. 1; Fig. 5, is an enlarged detail rear view of one of the side clamps of the tongue-holding socket of the hauling device; Fig. 6, is an enlarged transverse vertical section through the hub portion of one of the main traction wheels and showing its brake disk in elevation, as applied to the axle; Fig. 7, is a sectional view showing how a traction wheel may be removed from the axle and a power transmitting chain or belt wheel substituted on the axle for stationary engine driving purposes; Fig. 8, is a partial side view illustrating this use of the apparatus for stationary engine power transmission; Fig. 9, is a transverse sectional view of the frame supporting prop and its connection with the traction wheel axle casing; Fig. 10, is a vertical, longitudinal, view of the power transmitting gear interposed between the motor and the two-part driving shaft operating the traction wheels the casing thereof being shown in section; Fig. 11, is a longitudinal vertical sectional view of the hauling device at its tongue receiving socket, and taken on the line *b—b*, in Fig. 4; Fig. 12, illustrates application of roller bearings at the traction wheel axle boxes.

Numeral 1, indicates the metal frame of the apparatus or machine, which is normally supported by a pair of opposite side traction wheels 2, 2 and a forward pilot or steering wheel 3. The axle 4, of the wheel 2, is preferably surrounded by a protecting tubular casing 5, resting within eyes or sockets 6, formed at lower central parts of bowed brackets 7, bolted to the main frame 1. Roller bearings 8, may be placed between the axle casing and the axle as shown in Fig. 12, of the drawings. The traction wheels 2, are removably held to the axle by a key or spline 9, fixed in the axle and fitting a groove in the wheel hub. A brake disk 10, is fixedly held by said key 9 to the axle next each wheel 2, as seen in Figs. 1, 2, 3, 6 and 7, of the drawings. At its central part the axle casing 5, is enlarged to form a casing 11, inclosing the usual bevel gearing which transmits power to the axle and traction wheels from any suitable gasolene or other motor 12, in a casing 13, mounted on the frame 1, and by the aid of interposed transmission gearing, which is protected within a casing 14, held to the frame 1, and hereinafter more fully explained. The pilot wheel 3, is journaled in a yoke 15, having suitable fifth-wheel connections at 16, with a relatively stationary brace on the main frame. A hollow casing 17, is held to the frame 1, and into this casing the vertical steering shaft 18, of the wheel 3 passes. On this shaft 18, is fixed a horizontal bevel gear wheel 19, which is engaged by a bevel gear wheel 20, fixed to an operating shaft 21, journaled in the casing 18, and it may be also in a rear bearing 22, which may be held to the main frame 1, or to a foot board 23, held to the frame in front of the seat 24, of the motorman or operator who may easily reach a hand-wheel 25, on the shaft 21, for turning it and adjusting the steering wheel for guiding the apparatus. The pilot wheel bearings and shaft and bevel gearing and the front end of the motor casing 13, are all preferably held to an internal forward metal frame 26, bolted to the main frame 1, and angle-plate reinforces 27, are preferably bolted to the frames 1, 26, at the front corners to strengthen the forward portions of the frame. Another internal frame 28, bolted to the main frame 1, supports the seat 24, the foot-board 23, the rear end of the motor casing 13, and the levers controlling operation of the motor, and the starting and stopping and the reversible transmission gearing. The frame 28, also has cross-bars sustaining a tank 29, supplying gasolene to the motor 12. The motor and its casing are further supported by bent longitudinal braces 30, fastened at opposite ends to the frame 1, and passing under and fastened to the motor casing 13. A curved brake band 31, is pivoted at its lower end to the end of a bracket 32, fastened to the bracket 7, near each traction wheel brake disk 10, and the two bands 31, 31, are connected at their upper ends to a cross-bar 33, from which a rod 34, passes to a lever 35, fulcrumed on the internal frame 28, and having the usual spring-pressed latch bar adapted to lock into an ordinary curved rack on said frame for holding the brakes off, or for holding them on to any desired degree.

The power transmission mechanism is illustrated in detail in Fig. 10, of the drawings, which shows that the shaft leading from the motor 12, is made in two alined parts 36, 37, and that there is journaled below them in the casing 14, a countershaft 38. The shaft part 36, fixedly carries a pinion 39, and a coupling member 40, said pinion meshing constantly with a gear wheel "39ª" revolving on a pin fixed in a bracket "14ª" mounted on the frame 14, and constantly engaging the gear wheel 41, which is rigidly mounted on the countershaft 38. The shaft part 37 has fitted movably upon it by a spline and groove connection a clutch member 42, adapted to the opposed clutch member 40. To this member 42, is fixed a gear wheel 43, adapted to be engaged with and disengaged from a pinion 44, fixed to the countershaft 38. The clutch member 42, and gear 43, are together movable along the shaft 37, by a lever 45, having pins entering an annular groove of the hub 46, of the two connected parts 42, 43. The lever 45, extends upward through a slot in the transmission gear casing 14, and is fulcrumed on the frame 28, and carries an ordinary spring-pressed latch bar adapted to a curved rack on said frame. When the lever is adjusted to engage the gearing 43, 44, as shown by full lines in Fig. 10, of the drawings, the shaft portion 36, will through the gearing 39, 41, rotate the countershaft 38, and its pinion 44, by engaging the gear 43, will rotate the shaft portion 37, which operates the bevel gearing in the casing 11, for turning the axle 4, and the traction wheels 2, in one direction; the shafts 36, 37, 38 then rotating as indicated by the full line arrows thereon. When the lever 45 is shifted to engage the clutch members 40, 42, and disengage the gearing 43, 44, as indicated by dotted lines in Fig. 10, the shaft part 37, will be rotated in the opposite direction indicated by its dotted arrow and directly from the alined shaft part 36, while the gears 41 and 44 with their shaft 38, are rotated without effect on the power transmitting shaft 37. The opposite directions of rotation of the shaft 37, assure the turning of the axle 4, and traction wheels 2, in reverse directions for moving the whole apparatus forward or backward on the road as may be required in use. The casing 14 is preferably made in two upper and lower parts bolted together to permit access to the transmission gearing for inspection, adjustment or repairs.

As aforesaid this motor is adapted to haul plows, and other farm implements as a wagon, harvester, and the like, as will be more fully hereinafter set forth.

The hauling device will now be described with special reference to Figs. 1, 2, 4, 5 and 11, of the drawings. To the rear part of the main frame 1, are fixed opposite vertical guides 61, 61, in which are loosely fitted slides 62, 62, and an outer open frame 63, is fixed to and moves up and down with the slides. Within this frame 63, is arranged on opposite horizontal end pivots 64, 64, an inner swinging frame 65, to and within which, is held by opposite central vertical pivots 66, 66, a draft-head 67, which thus by means of the frames 65, 63, and the pivots 64, 66, is universally jointed or gimbal-mounted somewhat like a compass box. This assures that the draft-head may always and automatically assume a position with its face at right angles to the direct line of draft upon it irrespective of turns in or surface irregularities of the road on which may travel the traction apparatus or the implement or vehicle hauled thereby. At the center of the draft-head 67, there is fixed a socket 68, open at the rear end for receiving the forward end of the tongue of a harrow or other implement or vehicle. Within the socket are arranged suitable clamping devices which preferably are screws 69, having outside hand-wheels for turning them and provided at their inner ends with heads or plates 70, adapted for seizing and holding the forward end of the implement and vehicle tongue inserted in the socket. These plates 70 are fitted to the screws in manner allowing the screws to turn in them, as shown in Fig. 5, of the drawings, wherein the screw has an annular groove 71, receiving a transverse pin 72, passed through or into the hub of the plate 70, but any other suitable connection of the plates with the screws may be adopted. To the draft-head 67, at opposite sides of the socket 68, are journaled two winches 73, 73, the barrel of each of which carries a connected chain 74; the winch barrels have the usual circular rack 75, with which a pawl 76, pivoted to the head 67, may be engaged to prevent unwinding of the barrel, and the barrel shaft carries a crank 77, for winding the chain upon the barrel by hand. When the implement or vehicle tongue is fastened by the clamp screws within the socket 68, the chains 74, of the two winches are connected by their hooks or otherwise with the whiffletrees of the implement or vehicle and the chains will then be drawn up taut by the winches and all is ready to draw the implement or vehicle forward, or to back it, by correspondingly moving the apparatus on its wheels 2, 3. In order that the draft may be applied to the best advantage the entire draft-head and its gimbal bearings may be raised or lowered, by vertically adjusting the slides 62, in the guides 61, in any way but preferably by means of a lever 78, fulcrumed to a bracket 79, fixed to the main frame 1, and coupled by a chain 80, to the outer frame 63, and extending within reach of the operator on the seat 24. This lever has an ordinary latch 81, adapted to a segmental rack 82, on the bracket 79, for holding or locking the entire draft-head devices at proper vertical adjustment.

This apparatus is also capable of being advantageously used as a stationary engine for transmitting power for any desired purpose, the axle 4, and its casing 5, then being sufficiently jacked up to lift the traction wheels 2, from the ground or floor. A prop of any suitable kind, and shown as a foot-plate 83, having opposite connected side arms 84, 84, and normally hung on the axle casing 5, and held raised by hooks 85, coupled to the frame 1, and engaging pins 86, on the prop arms 84, is then released from the pins and is swung downward and the raised axle then is lowered by the jack until the prop foot-plate 83, rests solidly upon the ground or floor and the traction wheels then are free to turn on the axle clear of the ground. Longer rod braces 87, then may be applied to the prop pins 86, and to pins 88, on the frame 1, for bracing the apparatus securely against excessive vibration. One of the raised traction wheels 2, now may be removed from the axle 4, and a sleeve hub 89, having one or more plain pulleys 90, and chain pulleys 91, may be substituted for the wheel on the axle stub and one or more plain or chain belts 92, may then be run from said pulleys 90, 91, to the machine or machines to be operated at the barn or elsewhere. After finishing this stationary engine work it requires but a few minutes' time to remove the belt or belts and then remove the pulley carrying sleeve from the axle 4, and replace the traction wheel 2 thereon, and then raise the axle sufficiently by the jack to permit the prop 83, 84, to be again swung upward and secured by the hooks 85, and after the traction wheels 2, are lowered to the ground by the jack the entire apparatus is again ready for use as a traction engine for plowing or hauling purposes.

A lever 93, journaled on the seat supporting frame 28, is connected by a rod 94, with the devices controlling the starting and stopping of the engine 12, in the casing or hood 13. This casing has at its lower front portion an open screen 95, admitting air for cooling the engine, an outlet for the air being provided by an opening 96, at the rear end of the casing. As high speed of travel is not required this air circulation is deemed sufficient to keep the engine cool to maintain its efficiency without the use of fans or other auxiliary cooling apparatus. The casing 13, also preferably has a top cover 97, hinged at 98, to allow it to be readily opened for inspection and oiling of the engine, and the cover also has suitable latch devices 99, holding it closed.

Plowing, as aforesaid, is probably the most important work to which this apparatus may be applied. In performing this function, it has many advantages over animal drawn plows as it travels across the field at a higher speed which may be maintained for any length of time and therefore will do a much greater amount of work at less cost as, but one man is required to control the entire apparatus by handling the above described levers from his seat 24.

The general utility of this improved apparatus in land clearing, plowing, road making and maintenance, and for hauling implements or vehicles, threshing, corn-shelling, sawing wood, and for other purposes about a farm, make it useful in one way or another for practically the whole year and always with economy of time, labor and expense by comparison with other methods of doing the same work.

I claim as my invention:—

1. In a traction farming implement substantially as specified, the combination with the frame and the motor, of a hauling device comprising a slide vertically movable on the frame, and means comprising a pivoted lever, a spring latch on said lever, a segmental ratchet engaged by said latch, and a chain connecting said lever and said slide, and affording facility for adjusting said slide.

2. In a traction farming implement, the combination with the frame and motor thereon; of a hauling device comprising a slide vertically movable on the frame, and carrying an implement tongue holding socket and two winches, one on each side of said socket, and means for adjusting the slide, substantially as described.

3. In a traction farming implement, substantially as specified, the combination with the frame and motor thereon, of a hauling device comprising a slide vertically movable on the frame, a head universally jointed to said slide and carrying an implement tongue holding socket, and means for adjusting the slide, substantially as described.

4. In a traction farming implement, the combination with the frame and the motor, of a hauling device comprising a slide vertically movable on the frame, a head universally jointed to said slide and carrying an implement tongue holding socket, and two winches one on each side of said socket, and means adjusting the slide, substantially as described.

5. In a traction farming implement, substantially as specified, the combination with the frame and the motor, of a hauling device comprising an implement tongue receiving socket, mounted in a sliding support on said frame, a screw, clamping plate and hand wheel coöperating with said socket, and affording facility for detachably holding the end of said tongue in said socket.

6. In a traction farming implement, substantially as specified, the combination with the frame and motor, of a hauling device comprising a slide vertically movable in said frame, a pivoted lever, a spring lock on said lever, a segmental ratchet engaged by said latch, and a chain connecting said slide and lever, and a socket mounted on said slide and affording facility for attaching vehicles and implements to said hauling device, to be hauled thereby.

7. In a traction farming implement, substantially as specified, the combination with the frame and motor, of a hauling device comprising a slide vertically movable in said frame, a pivoted lever, a spring latch on said lever, a segmental ratchet engaged by said latch, and a flexible connection attaching said lever to said slide, and the four last mentioned elements coöperating to move and adjust said slide, and a holding device comprising a socket universally mounted in said slide, and a screw, clamping plate and hand wheel coöperating in, on and with said socket to detachably hold the end of the tongue of the vehicles and implements to be hauled by said hauling motor.

In testimony that, I claim the foregoing as my invention, I have signed my name in presence of two witnesses, this 25th day of October 1906.

HAROLD ARTHUR HEAVEY.

Witnesses:
R. C. SNELLING,
C. P. NEWCOMER.